United States Patent
Hug

(10) Patent No.: US 6,866,138 B2
(45) Date of Patent: Mar. 15, 2005

(54) APPARATUS FOR DISCHARGING LOAD CARRIERS

(75) Inventor: Jürgen Hug, Rodgau (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/813,742

(22) Filed: Mar. 31, 2004

(65) Prior Publication Data

US 2004/0216984 A1 Nov. 4, 2004

(30) Foreign Application Priority Data

Mar. 31, 2003 (DE) .......................................... 103 28 555

(51) Int. Cl.⁷ ............................................. B65G 47/64
(52) U.S. Cl. ........................... 198/457.03; 198/370.08; 198/370.1
(58) Field of Search ........................ 198/370.1, 370.08, 198/457.03

(56) References Cited

U.S. PATENT DOCUMENTS

| | | | | |
|---|---|---|---|---|
| 1,098,239 A | * | 5/1914 | Ewen ..................... | 198/370.01 |
| 1,934,377 A | * | 11/1933 | Robbins ..................... | 198/352 |
| 1,980,261 A | * | 11/1934 | Fenton ........................ | 198/367 |
| 2,725,137 A | * | 11/1955 | Muddiman .................. | 198/409 |
| 3,291,278 A | * | 12/1966 | Meinas .................. | 198/370.01 |
| 3,522,942 A | * | 8/1970 | Hepp ...................... | 270/52.14 |
| 4,193,491 A | * | 3/1980 | James et al. ............. | 198/468.8 |
| 4,437,560 A | * | 3/1984 | Wolf ..................... | 198/457.03 |
| 4,619,358 A | * | 10/1986 | May et al. ............. | 198/457.03 |
| 4,798,175 A | * | 1/1989 | Townsend et al. ........ | 340/572.7 |
| 4,926,999 A | * | 5/1990 | Fauth et al. ................. | 198/358 |
| 5,609,236 A | * | 3/1997 | Neukam .................. | 198/370.1 |
| 5,927,469 A | * | 7/1999 | Dunifon et al. ............. | 198/456 |
| 5,971,132 A | * | 10/1999 | Bonnet ................... | 198/370.07 |
| 5,988,351 A | * | 11/1999 | Warkentin ............. | 198/370.04 |
| 6,202,828 B1 | * | 3/2001 | Roskam ................. | 198/457.03 |
| 6,236,008 B1 | * | 5/2001 | Bonnet ........................ | 209/583 |
| 6,370,447 B1 | * | 4/2002 | Miyazaki ..................... | 700/230 |
| 6,581,749 B2 | * | 6/2003 | Wood et al. ........... | 198/370.09 |
| 6,607,065 B2 | * | 8/2003 | Peppel ........................ | 198/367 |
| 6,644,459 B2 | * | 11/2003 | van Leeuwen et al. .. | 198/370.1 |
| 6,660,953 B2 | * | 12/2003 | Lem et al. .................. | 209/564 |
| 6,719,126 B2 | * | 4/2004 | Badier et al. ............... | 198/809 |
| 6,736,591 B2 | * | 5/2004 | Buck ....................... | 414/797.9 |

* cited by examiner

Primary Examiner—Douglas Hess
(74) Attorney, Agent, or Firm—Van Dyke, Gardner, Linn & Burkhart, LLP

(57) ABSTRACT

The invention relates to an apparatus for discharging and transferring load carriers to connection conveyors (2), running transversely to a conveying path (1), by means of transporting belts (2a, b and c) which circulate parallel to one another, and transversely to the conveying path, and form a horizontal rest for the load carriers (3). In order to provide such an apparatus which, along with a low level of production outlay and straightforward functioning, operates quickly and effectively, it is proposed that at least two of the transporting belts (2a and 2b) project at least into that half of the conveying path (1) which is directed toward the discharging apparatus (4), and at least one further transporting belt (2c) passes through the conveying path (1), and that the transporting belts run beneath the transporting planes of the conveying path (1) and are fitted on the carrying side, in certain sections, with bearing strips (14) which, as the transporting belts (2a, b and c) circulate, can be moved upward out of the transporting planes of the conveying path (1), the bearing strips gripping beneath a load carrier (3), which is positioned above the transporting belts, at at least three bearing points.

30 Claims, 2 Drawing Sheets

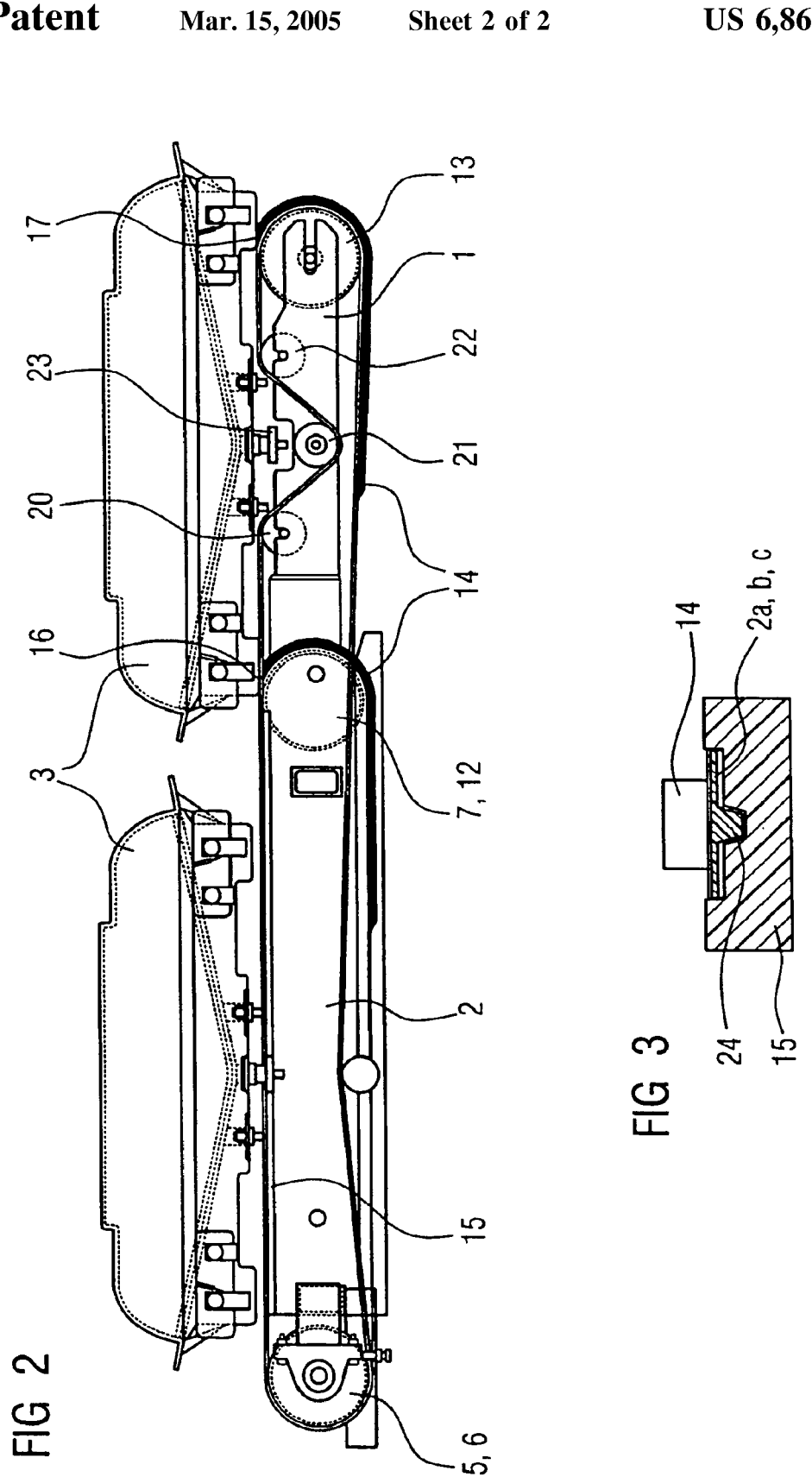

APPARATUS FOR DISCHARGING LOAD CARRIERS

BACKGROUND OF THE INVENTION

The invention relates to an apparatus for discharging load carriers, such as article containers, pallets or the like, transported on a conveying path, in particular a roller conveyor, and for transferring the load carriers to storage locations or connection conveyors, running transversely to the conveying path, by means of a plurality of transporting belts which circulate in vertical planes, parallel to one another and transversely to the conveying path, about deflecting wheels and form a horizontal rest for the load carriers.

Such conveying paths serve for transporting articles, and are used, for example, for transporting baggage in baggage-distributing installations, the items of baggage being deposited in containers and transported to their destinations. The term container here, rather than being restricted to closed receptacles, also covers, for example, pallets with grid-like side boundaries which are open in the upward direction.

Such a conveying path can also perform a storage function by containers being discharged from the conveying path, set down on a connection conveyor and, if necessary, re-introduced into the conveying flow at right angles. Discharging the containers at right angles from the conveying flow means that less space is required for storage purposes than if, as has been customary hitherto, storage were to take place in the longitudinal direction.

Various solutions have been disclosed in order for it to be possible for load carriers to be discharged laterally from conveying paths. For example, DE 40 33 699 describes the transfer station of a conveying path with driven transfer conveyors for transporting units, such as pallets, articles and the like, which are transferred, by the transfer conveyor, from the conveying path to a laterally adjoining removal conveyor. For transfer purposes, the transfer conveyor, which is arranged either over the course of the conveying path or at the end of the latter, is pivoted, together with the transporting unit resting on it, out of the conveying direction of the conveying path, about a vertical axis, in the direction of the removal conveyor. Transportation onto the adjacent removal conveyor then takes place by virtue of the driven carrying rollers of the transfer conveyor. Such an apparatus is disadvantageous because the pivoting operation is very time-consuming, and also because it is always necessary for the transfer conveyor to be pivoted back. The known apparatus is also complicated and expensive in respect of the rotary drives which are used.

DE 28 39 339 C2 has disclosed an arrangement for raising two tracks which cross over one another, the raising operation taking place here via eccentrics. Since the solution requires a height-adjusting apparatus, it is complicated and expensive. Finally, DE 42 08 230 describes a belt conveyor which may also be configured as a corner transfer means with two outer belt strands running in one direction and two or three inner belt strands which run between the outer belt strands, transversely thereto. This known corner transfer means also requires a vertical drive for transferring the transportable articles with the aid of the raised conveying belts, and is thus complicated, expensive and relatively slow.

SUMMARY OF THE INVENTION

The object of the present invention is to propose an apparatus which is intended for discharging or transferring load carriers transported on a conveying path and which, along with low production outlay and straightforward functioning, operates quickly and effectively.

In order to achieve this object, it is proposed according to the invention that at least two of the transporting belts project at least into that half of the conveying path which is directed toward the discharging apparatus, and at least one further transporting belt passes through the conveying path, and that the transporting belts run beneath the transporting plane of the conveying path and are fitted on the carrying side, in certain sections, with bearing strips which, as the transporting belts circulate, can be moved upward out of the transporting plane of the conveying path, the bearing strips gripping beneath a load carrier, which is positioned above the transporting belts, at at least three bearing points.

The apparatus proposed for discharging load carriers lifts the containers via at least three parallel transporting belts, which each bear part of a bearing strip, merely via the traveling mechanism, without any additional lifting drive. Outside the discharging operation, the transporting belts circulate beneath the transporting plane of the conveying path. As soon as a load carrier which is to be discharged is positioned in the discharging apparatus, i.e., above the transporting belts, the transporting belts are made to circulate, in which case the bearing strips are moved upward out of their rest positions beneath the transporting plane, with the result that the bearing strips, in accordance with their positioning on the transporting belt, grip beneath the load carrier and lift it up from the conveying path. As the transporting belts circulate further, the load carrier, resting on the bearing strips, is moved transversely to the conveying path and set down at the location where the bearing strips, upon circulation about the deflecting wheels, descend downward beneath the conveying plane.

It is preferably provided that a total of three transporting belts are provided, the transporting belt which passes through the conveying path being arranged between the two outer transporting belts, which project into the conveying path. Two outer parallel transporting belts are normally provided, these projecting into the side region of that side of the conveying path which is directed toward the discharging apparatus, and gripping beneath a bearing edge of the load carrier. At least one further transporting belt, although two further transporting belts are also conceivable, is arranged between these two outer transporting belts, and passes through the conveying path in the region of corresponding cutouts. These project into that border region of the conveying path which is directed away from the discharging apparatus. In this way, it is possible, for example, for the two outer carrying belts to use their bearing strips, upon circulation about the deflecting wheels, to raise the load carrier at the two front bearing-edge regions, while, at the same time, the carrying belt or belts arranged therebetween raises or raise the opposite bearing edge of the load carrier. This ensures that the load carrier is lifted up from the conveying path, and displaced laterally, approximately parallel to the horizontal conveying plane.

Of course, it is also possible, according to another configuration of the invention, for the transporting belts which pass through the conveying path to be arranged on the outside, while the transporting belt or belts projecting into the conveying path is or are arranged therebetween.

According to the invention, in each case one deflecting wheel of each transporting belt can preferably be driven. The second deflecting wheel is made to circulate by the transporting belt.

It is particularly advantageous if the deflecting wheels which are arranged outside the conveying path and belong at least to the transporting belts which project into the conveying path are arranged on a common axle and are designed as synchronously drivable drive wheels. In this way, in addition to simplifying the drive and the design, synchronous circulation of the transporting belts is thus also ensured, in particular if, according to a further feature of the invention, the drive wheels of the transporting belts which project into the conveying path are fastened on a common shaft which can be driven via an add-on driving gear motor. The two transporting belts can thus be driven synchronously by just a single drive.

It is advantageous in design terms if, in a favorable configuration of the invention, it is also the case that the non-driven deflecting wheels of the transporting belts which project into the conveying path are arranged on a common shaft.

If, according to the invention, a deflecting wheel of the transporting belt which passes through the conveying path is arranged on the common shaft with the non-driven deflecting wheels of the transporting belts which project into the conveying path, then a further drive for these transporting belts is dispensed with since the deflecting wheel is entrained via the common shaft, by way of the other driven transporting belts.

In order to ensure that all the transporting belts are synchronized, the transporting belts have the same circumferential lengths and are configured as toothed belts which, by way of their toothed side, engage in the driving deflecting wheels, which are provided with corresponding mating toothing. Toothed belts are particularly well-suited to being used in the present invention because they can discharge even large loads without slippage and because the synchronism of the transporting belts, circulating in parallel, is guaranteed by the toothing.

According to a further feature of the invention, the bearing strips of the apparatus according to the invention are attached to the transporting belts by welding, vulcanization or screw connection. The bearing strips may be produced in one piece, but have to be capable of elastic deflection about the deflecting wheels; it is also conceivable for the strips to be made up of individual segments or segment parts.

BRIEF DESCRIPTION OF THE DRAWINGS

The present invention and the functioning thereof are explained most straightforwardly using the drawings, which illustrate an exemplary embodiment. In the drawings:

FIG. 2 shows a side view of the apparatus according to the invention with containers; and FIG. 3 shows a sectional view of the transporting belt used in a sliding profile.

DETAILED DESCRIPTION OF THE PREFERRED EMBODIMENT

Figure 1:
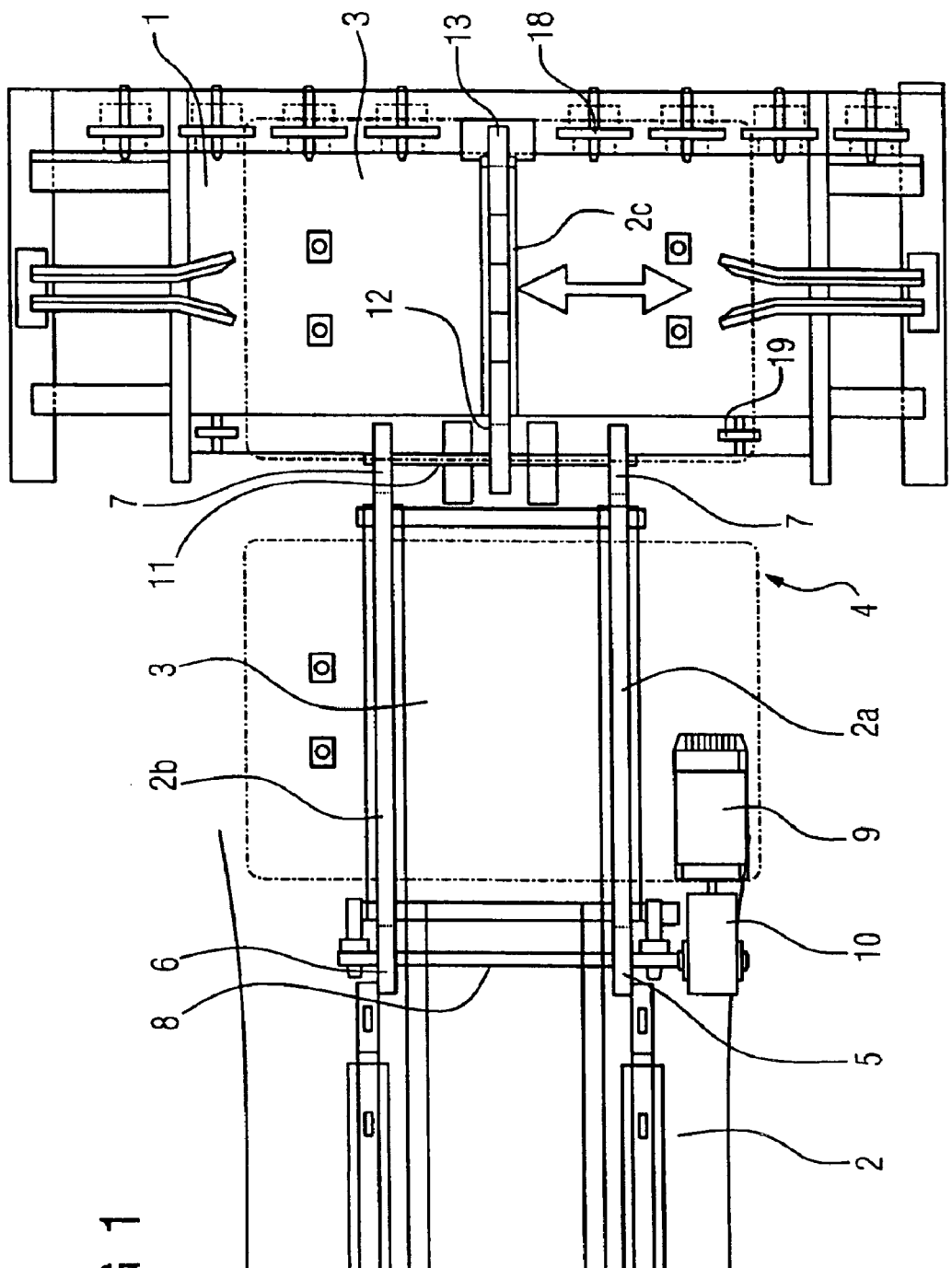
FIG. 1 shows a plan view of the discharging apparatus according to the invention.

The exemplary embodiment of the invention shows, in roughly schematic form, a baggage conveyor as is used in airports for transporting, distributing and storing items of baggage. FIG. 1 illustrates a plan view of an arrangement according to the invention which comprises the conveying path, designated 1, in the form of a roller conveyor, which is connected to the transverse or connection conveyor 2. In order for it to be possible for containers 3, which are guided up or away on the roller conveyor 1, to be transferred to the transverse conveyor 2, the discharging apparatus according to the invention, which is designated 4 as a whole, is provided. This apparatus comprises three circulating transporting belts, which are designed as toothed belts and are designated 2a, 2b and 2c. As can be seen in FIG. 1 of the drawings, the transporting belts 2a and 2b are guided, on that side which is directed away from the roller conveyor 1, about deflecting wheels 5 and 6 such that they circulate in vertical planes. As can be seen, the two outer transporting belts 2a and 2b project merely into the border region of the roller conveyor 1, where they are guided about the deflecting wheels 7, which are mounted on the framework of the roller conveyor. The deflecting wheels 5 and 6, which are arranged on the opposite side, are arranged, and driven, on a common shaft.

A common drive motor 9 is provided for the two deflecting wheels 5 and 6 arranged on a common shaft, this drive motor directing its driving torque, via a gear mechanism 10, directly into the common shaft and ensuring synchronous circulation of the two transporting belts. The deflecting wheels 7 of the transporting belts 2a and 2b are likewise arranged on a common shaft, although the latter is not assigned a separate drive. The freely rotatably mounted shaft 11, on which the deflecting wheels 7 are fastened, is driven via the driven transporting belts 2a and 2b. The deflecting wheel 12 of the transporting belt 2c is fastened in the center of the shaft 11, between the two deflecting wheels 7, with a result that this deflecting wheel 12 is driven in rotation via the drive chain 9, 10, 8, 5/6, 2a/2b, 7 and 11 and causes circulation of the transporting belt 2c, which circulates via the deflecting wheels 12 and 13. The transporting belt 2c here passes through the roller conveyor 1 and grips beneath the container 3 (illustrated by chain-dotted lines), in order for it to be possible for this container to be transferred from the roller conveyor 1 to the transverse conveyor 2 by the apparatus 4 according to the invention.

It can be seen from the side view in FIG. 2 that all three transporting belts 2a, b and c are provided with bearing strips 14 which are positioned on the top side of the transporting belts, but nevertheless extend only over certain sections of the longitudinal circumference of the endlessly circulating transporting belts 2a, b and c. It can likewise be seen in FIG. 2 that the top strands of the transporting belts 2a and b are supported by slide rails 15, in order to ensure the load-bearing capability of the transporting belts. At the location in FIG. 2 where a container 3 is positioned on the roller conveyor 1 (right-hand side of the drawing), it can be seen that in each case the start of the bearing strips 14 fitted on the outer transporting belts 2a and b begins to grip beneath the container 3 at 16. The start of the bearing strips 14 which are fitted on the central transporting belt 2c begins to grip beneath the container 3 at 17. As the equal-length transporting belts 2a, 2b and 2c circulate about the respective deflecting wheels 5 and 7, 6 and 7, and 12 and 13, which are all driven directly or indirectly by the drive 9/10, the bearing strips 14, with the top strand of the transporting belts 2a, 2b and 2c, move to the left (in the figure). In this case, the bearing strips 14 lift out of the transporting plane of the conveying path and transport the container 3, which is lifted up from the rollers 18 and 19 (FIG. 1) of the roller conveyor 11, to the left. In this case, the container 3 rests on the bearing strips 14 at 16 and 17 in the first instance as transportation continues, to be precise the front edge of the container 3 rests on the bearing strips 14 of the two outer transporting belts 2a and 2b and the rear region of the container 3 rests on the bearing strip 14 of the central transporting belt 2c. This state is maintained until the bearing strips 14 of the transporting belts 2a and 2b and the bearing strip 14 of the transporting belt 2c "descend" downward beneath the conveying plane about the respective deflecting wheels 5, 6 and 12 and deposit the container again in its original conveying plane on the transverse conveyor 2, which is designed as a roller conveyor.

It can be seen from the right-hand half of the drawing in FIG. 2 that the transporting belt 2c is deflected downward from its original direction about further deflecting wheels 20, 21 and 22. This downward deflection is provided in order for the downwardly projecting drive means 23 not to be obstructed on the containers 3 in the transporting direction (perpendicular to the plane of the drawing) on the roller conveyor. There is no other reason for this deflection, as far as the invention is concerned, and it does not change the functioning of the latter as long as all of the circulating transporting belts are of the same length.

In order for both to ensure synchronous circulation of the transporting belts and to avoid slippage of the transporting belts, which would displace the positions of the bearing strips relative to one another, the transporting belts 2a, b and c are designed as toothed belts, as can be seen in the sectional illustration according to FIG. 3. At least the driving deflecting wheels 5 and 6, and 12, are likewise toothed in accordance with the toothings of the transporting belts, a central crosspiece 24 between the toothings of the transporting belts ensuring that the transporting belts are guided straight ahead.

It is, of course, possible for the apparatus, which is illustrated in an exemplary embodiment as a discharging apparatus, to be used, by kinematic reversal, for introduction purposes; it is also possible for it, in the form of a corner transfer means, to produce a connection to a transverse conveyor at the end of a conveying path, and it may also be operated as a diverter.

The particular advantage of the present invention is its simplicity and functionality, because there is no need for either couplings or high-outlay lifting means, as are necessary in the prior art, in order for the containers to be laterally discharged from, or introduced into, a conveying path.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. An apparatus for discharging load carriers transported on a conveying path and for transferring the load carriers to storage locations or connection conveyors, running transversely to the conveying path, said apparatus comprising:

a plurality of transporting belts which circulate in vertical planes, parallel to one another and transversely to the conveying path, about deflecting wheels, wherein said plurality of transport belts form a horizontal rest for the load carriers;

wherein at least two of the transporting belts project at least into that half of the conveying path which is directed toward the discharging apparatus, and at least one further transporting belt passes through the conveying path;

wherein said transporting belts run beneath the transporting planes of the conveying path and are fitted on the carrying side, in certain sections, with bearing strips;

said bearing strips are moved upward out of the transporting planes of the conveying path as the transporting belts circulate, said bearing strips gripping beneath a load carrier that is positioned above the transporting belts at at least three bearing points.

2. The apparatus as claimed in claim 1, wherein said plurality of transporting belts comprise three transporting belts, the transporting belt which passes through the conveying path being arranged between the two outer transporting belts, which project into the conveying path.

3. The apparatus as claimed in claim 2, wherein one deflecting wheel of each transporting belt can be driven.

4. The apparatus as claimed in claim 3, wherein the deflecting wheels which are arranged outside the conveying path and belong at least to the transporting belts, which project into the conveying path, are arranged on a common axle and are designed as synchronously drivable drive wheels.

5. The apparatus as claimed in claim 3, wherein the drive wheels of the transporting belts, which project into the conveying path, are fastened on a common shaft which can be driven via an add-on driving gear motor.

6. The apparatus as claimed in claim 5, wherein the non-driven deflecting wheels of the transporting belts, which project into the conveying path, are arranged on a common shaft.

7. The apparatus as claimed in claim 6 including a deflecting wheel of the transporting belt, which passes through the conveying path, that is arranged on the common shaft with the non-driven deflecting wheels of the transporting belts that project into the conveying path.

8. The apparatus as claimed in claim 7, wherein the transporting belts have the same circumferential lengths and are configured as toothed belts which, by way of their toothed side, engage in the driving deflecting wheels, which are provided with corresponding mating toothing.

9. The apparatus as claimed in claim 8, wherein said bearing strips are attached to the transporting belts by welding, vulcanization or screw connection.

10. The apparatus as claimed in claim 1, wherein said plurality of transporting belts comprise three transporting belts, the transporting belts which pass through the conveying path being arranged on both sides of the transporting belt, which projects into the conveying path.

11. The apparatus as claimed in claim 10, wherein one deflecting wheel of each transporting belt can be driven.

12. The apparatus as claimed in claim 11, wherein the deflecting wheels which are arranged outside the conveying path and belong at least to the transporting belts, which project into the conveying path, are arranged on a common axle and are designed as synchronously drivable drive wheels.

13. The apparatus as claimed in claim 11, wherein the drive wheels of the transporting belts, which project into the conveying path, are fastened on a common shaft which can be driven via an add-on driving gear motor.

14. The apparatus as claimed in claim 13, wherein the non-driven deflecting wheels of the transporting belts, which project into the conveying path, are arranged on a common shaft.

15. The apparatus as claimed in claim 14 including a deflecting wheel of the transporting belt, which passes through the conveying path, that is arranged on the common shaft with the non-driven deflecting wheels of the transporting belts that project into the conveying path.

16. The apparatus as claimed in claim 15, wherein the transporting belts have the same circumferential lengths and are configured as toothed belts which, by way of their toothed side, engage in the driving deflecting wheels, which are provided with corresponding mating toothing.

17. The apparatus as claimed in claim 16, wherein said bearing strips are attached to the transporting belts by welding, vulcanization or screw connection.

18. The apparatus as claimed in claim 1, wherein one deflecting wheel of each transporting belt can be driven.

19. The apparatus as claimed in claim 18, wherein the deflecting wheels which are arranged outside the conveying path and belong at least to the transporting belts, which project into the conveying path, are arranged on a common axle and are designed as synchronously drivable drive wheels.

20. The apparatus as claimed in claim 18, wherein the drive wheels of the transporting belts, which project into the conveying path, are fastened on a common shaft which can be driven via an add-on driving gear motor.

21. The apparatus as claimed in claim 20, wherein the non-driven deflecting wheels of the transporting belts, which project into the conveying path, are arranged on a common shaft.

22. The apparatus as claimed in claim 21 including a deflecting wheel of the transporting belt, which passes through the conveying path, that is arranged on the common shaft with the non-driven deflecting wheels of the transporting belts that project into the conveying path.

23. The apparatus as claimed in claim 22, wherein the transporting belts have the same circumferential lengths and are configured as toothed belts which, by way of their toothed side, engage in the driving deflecting wheels, which are provided with corresponding mating toothing.

24. The apparatus as claimed in claim 23, wherein said bearing strips are attached to the transporting belts by welding, vulcanization or screw connection.

25. The apparatus as claimed in claim 1, wherein deflecting wheels which are arranged outside the conveying path and belong at least to the transporting belts, which project into the conveying path, are arranged on a common axle and are designed as synchronously drivable drive wheels.

26. The apparatus as claimed in claim 1, wherein drive wheels of the transporting belts, which project into the conveying path, are fastened on a common shaft which can be driven via an add-on driving gear motor.

27. The apparatus as claimed in claim 1, wherein non-driven deflecting wheels of the transporting belts, which project into the conveying path, are arranged on a common shaft.

28. The apparatus as claimed in claim 27 including a deflecting wheel of the transporting belt, which passes through the conveying path, that is arranged on the common shaft with the non-driven deflecting wheels of the transporting belts that project into the conveying path.

29. The apparatus as claimed in claim 1, wherein the transporting belts have the same circumferential lengths and are configured as toothed belts which, by way of their toothed side, engage in the driving deflecting wheels, which are provided with corresponding mating toothing.

30. The apparatus as claimed in claim 1, wherein said bearing strips are attached to the transporting belts by welding, vulcanization or screw connection.

* * * * *